US008858173B2

(12) United States Patent
Marsal et al.

(10) Patent No.: US 8,858,173 B2
(45) Date of Patent: Oct. 14, 2014

(54) BEARING ASSEMBLY WITH DAMPING FEATURES

(75) Inventors: Damien Marsal, Golbey (FR); Raphael Hettinger, La Baffe (FR); Jean-Pierre Lassalle, Thaon les Vosges (FR)

(73) Assignee: Honeywell International Inc., Morristown, NJ (US)

(*) Notice: Subject to any disclaimer, the term of this patent is extended or adjusted under 35 U.S.C. 154(b) by 725 days.

(21) Appl. No.: 13/100,968

(22) Filed: May 4, 2011

(65) Prior Publication Data

US 2012/0282078 A1 Nov. 8, 2012

(51) Int. Cl.
F04D 29/04 (2006.01)
F16C 27/04 (2006.01)
F01D 25/18 (2006.01)
F16C 19/54 (2006.01)
F04D 29/66 (2006.01)
F04D 29/063 (2006.01)
F01D 25/16 (2006.01)
F04D 29/059 (2006.01)
F16C 25/08 (2006.01)

(52) U.S. Cl.
CPC .............. *F04D 29/059* (2013.01); *F16C 27/04* (2013.01); *F01D 25/18* (2013.01); *F16C 19/548* (2013.01); *F05D 2260/96* (2013.01); *F04D 29/668* (2013.01); *F04D 29/063* (2013.01); *F01D 25/164* (2013.01); *F05D 2220/40* (2013.01); *F16C 25/083* (2013.01)

USPC ........................................................... 415/229

(58) Field of Classification Search
CPC . F04D 29/056; F04D 29/0563; F04D 29/059; F04D 29/063; F04D 29/668; F01D 25/162; F01D 25/164
USPC ........................................................... 415/229
See application file for complete search history.

(56) References Cited

U.S. PATENT DOCUMENTS 4,721,441 A * 1/1988 Miyashita et al. ............ 417/407
5,622,358 A 4/1997 Komura et al.
5,639,074 A 6/1997 Greenhill et al.

FOREIGN PATENT DOCUMENTS

JP H06-001737 U 1/1994
JP 2005171796 A 6/2005
WO 2005057032 A1 6/2005

* cited by examiner

*Primary Examiner* — Dwayne J White
(74) *Attorney, Agent, or Firm* — Brian J. Pangrle

(57) ABSTRACT

A turbocharger bearing assembly can include a compressor side bearing; a turbine side bearing; and a spacer configured to axially space the compressor side bearing and the turbine side bearing where the spacer includes lubricant passages to direct lubricant to spacer-bearing interfaces and where the spacer optionally includes a spring disposed in a central through bore to load the bearings. Various other examples of devices, assemblies, systems, methods, etc., are also disclosed.

19 Claims, 8 Drawing Sheets

BEARING ASSEMBLY WITH DAMPING FEATURES

TECHNICAL FIELD

Subject matter disclosed herein relates generally to turbomachinery for internal combustion engines and, in particular, to bearing assemblies.

BACKGROUND

Exhaust driven turbochargers include a rotating shaft carrying a turbine wheel and a compressor wheel where the shaft is typically rotatably supported within a center housing by one or more lubricated bearings (e.g., oil lubricated). During operation, exhaust from an internal combustion engine drives a turbocharger's turbine wheel, which, in turn, drives the compressor wheel to boost charge air to the internal combustion engine.

During operation, a turbocharger's rotating assembly may reach rotational speeds in excess of 100,000 rpm. To handle such high speeds, a turbocharger's center housing rotating assembly (CHRA) requires balance and adequate lubrication. Factors such as noise, vibration and harshness (NVH), as well as efficiency, are often interrelated and must be within acceptable limits. As an example of interrelatedness, vibration can generate noise and reduce efficiency. Further, under dynamic conditions, such as an increase in exhaust flow, axial thrust forces can cause contact between various CHRA components. Contact can cause wear, which, in turn, can alter balance, leading to increased noise, vibration, etc., and reduced efficiency.

Various technologies described herein pertain to bearing assemblies, where, for example, one or more components can provide for increased damping and, consequently, reduced CHRA vibration.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Various turbocharger bearing assemblies are described herein. For example, a turbocharger bearing assembly can include a spacer configured to space two turbocharger bearings. Such a spacer may be configured as an annular body that defines a central through bore and that includes an axial end face, an opposing axial end face, a lubricant passage configured to direct lubricant to the axial end face, and a lubricant passage configured to direct lubricant to the opposing axial end face. Such lubricant passages can provide for lubricant film formation along the axial end faces to aid in damping. Further, a spring may be disposed in the central through bore of a spacer. For example, a wave spring may have an uncompressed length that exceeds a length of a spacer such that the wave spring can load one or more bearings disposed adjacent to the spacer. In combination, a lubricant film and spring loading can damp CHRA forces that occur during operation of a turbocharger.

In various examples, a spacer may include one or more lubricant wells located at an axial end face. For example, a spacer may include an annular compressor end well and an annular turbine end well, which may be symmetric or asymmetric (e.g., on an end or one end compared to the other end). In an example of an alternative arrangement of features, a spacer may include a lubricant passage to direct lubricant to one or more lubricant wells of an axial end face of a bearing (e.g., a lubricant manifold, etc.). In the foregoing examples, formation of lubricant films can occur between a spacer and one or more bearings.

Trials for an example of a bearing assembly with damping features indicate that CHRA vibration can be reduced. In particular, where a spacer with lubricant passages and a spring are disposed between two ball bearing cartridges, the spring and lubricant act on outer races of the ball bearings to handle axial thrust forces (e.g., directed toward a compressor or directed toward a turbine). Assessments as to durability and performance demonstrated benefits. Further benefits include increased throughput on CHRA vibration testing and balancing (e.g., using a vibration sorting rig or VSR). As to balancing, a VSR machine provides for measurement of dynamic imbalance by operating a CHRA at high-speed. Typical corrections include changing assembly position or removing metal from a compressor wheel (e.g., a compressor wheel, end nut, etc.) to achieve acceptable balance. With increased damping provided by lubricant films and spring loading, certain vibrations are removed from dynamic imbalance measurements, which can allow for improved assembly balancing. Ultimately, for turbocharged passenger vehicles, passenger environmental conditions can be improved (e.g., reduced NVH).

Below, an example of a turbocharged engine system is described followed by various examples of components, assemblies, methods, etc.

Figure 1:
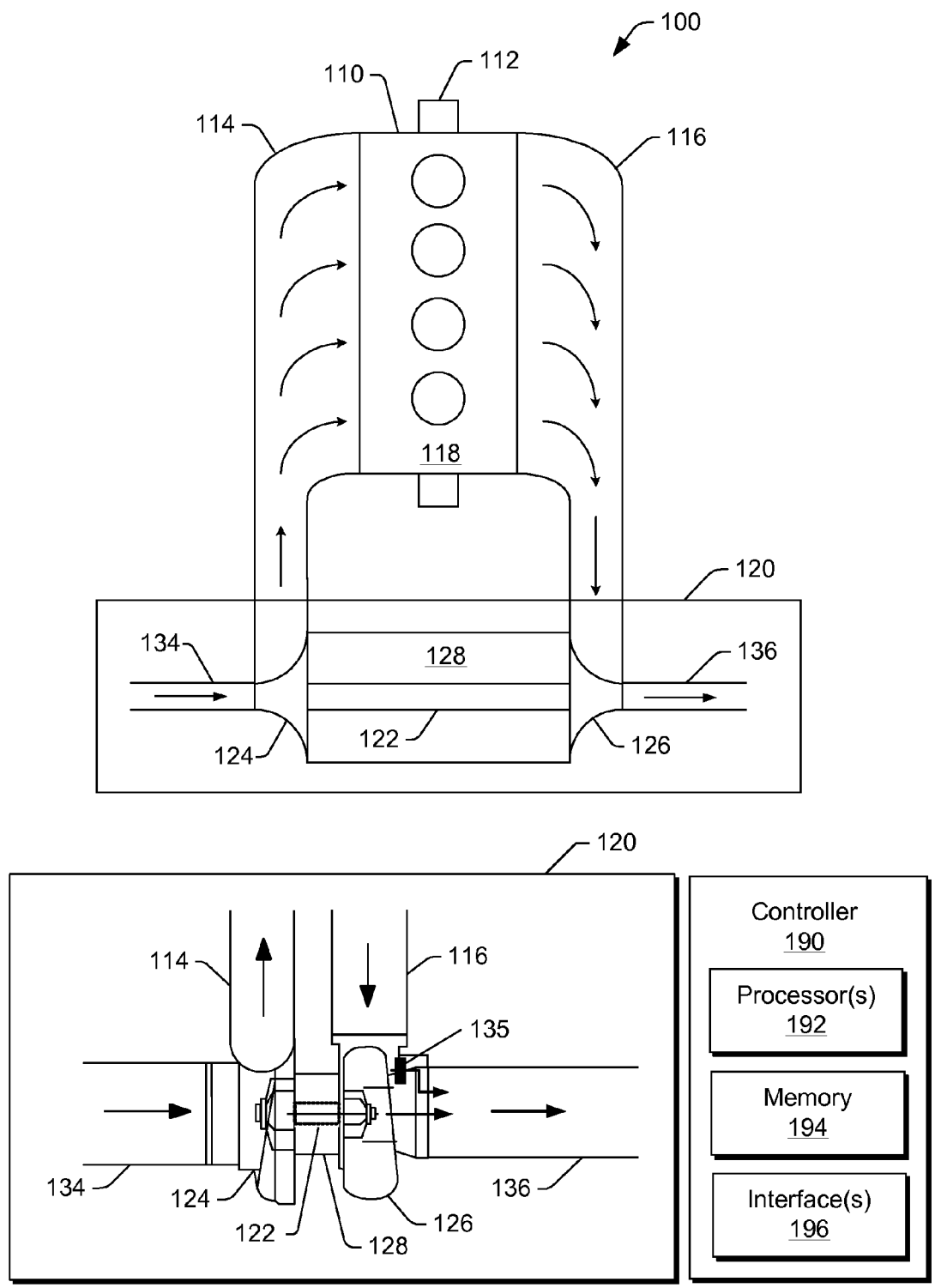
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
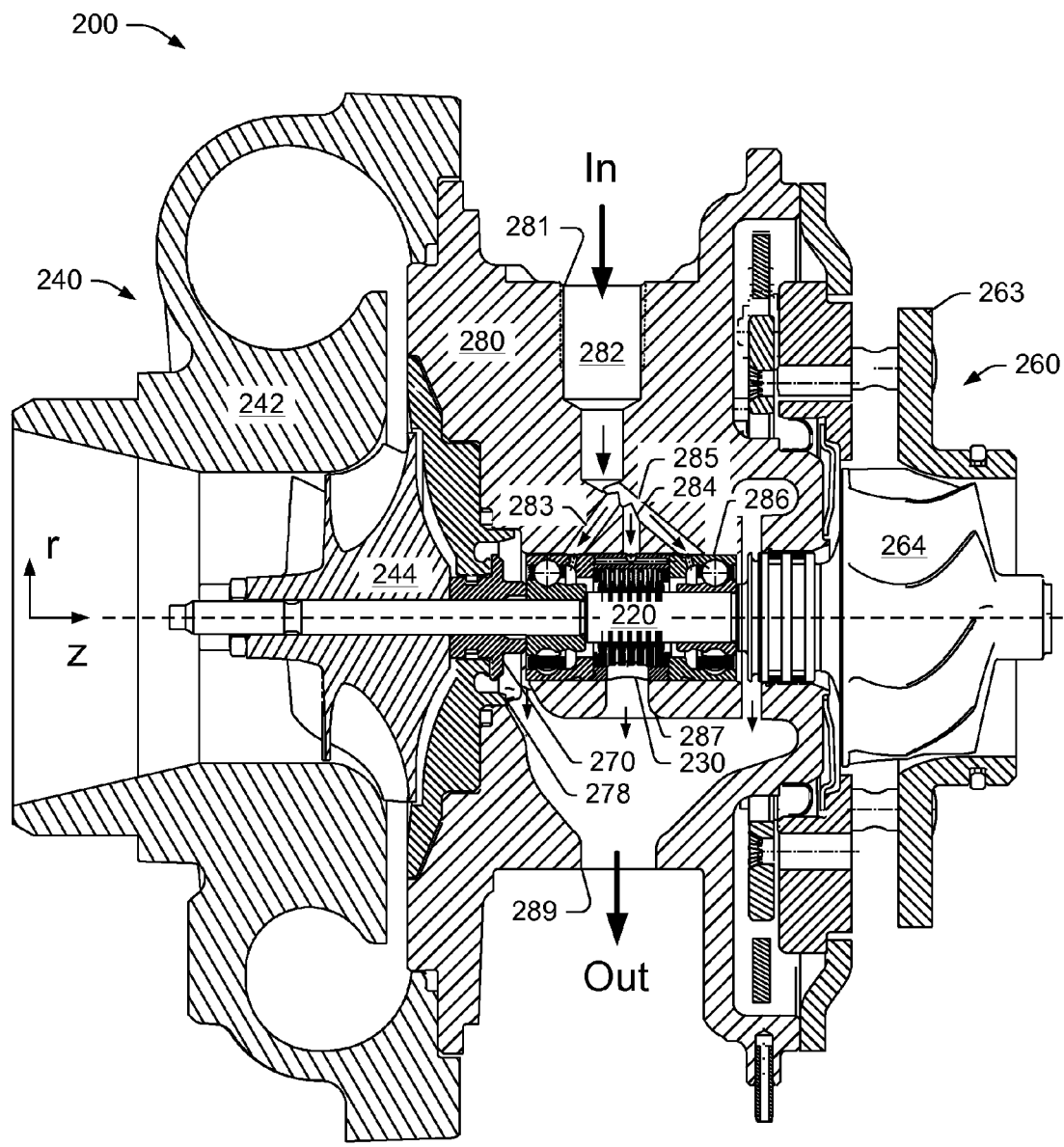
FIG. 2 is a cross-sectional view of an example of a turbocharger assembly that includes a bearing assembly with two bearings and a spacer.

FIG. 2 shows an example of a turbocharger assembly 200 that includes a shaft 220 supported by a bearing assembly 230 disposed in a housing 280 between a compressor 240 and a turbine 260. In the example of FIG. 2, the assembly 200 also includes a thrust collar 270 disposed in a bore of a compressor plate 278. The compressor 240 includes a compressor housing 242 that defines a volute and that houses a compressor wheel 244. The turbine 260 is shown as including a base and shroud assembly 263 that defines a throat to direct exhaust to a turbine wheel 264.

In the example of FIG. 2, the housing 280 includes a lubricant inlet 281 and a lubricant outlet 289. Lubricant flows from the inlet 281 to the outlet 289 via a bore 282 that directs lubricant to various lubricant passages with openings along an axial bore 286 of the housing 280. For example, the housing 280 includes a compressor side bearing lubricant passage 283, a spacer lubricant passage 284 and a turbine side bearing lubricant passage 285. As described herein, a housing may include one or more lubricant passages to direct lubricant to a spacer. Lubricant may exit the bore 286 via a compressor end, a turbine end or a passage 287 disposed between the compressor end and the turbine end. The outlet 289 collects lubricant that flows through or around the bearing assembly 230, which may be cooled, filtered, etc., and eventually recirculated to the inlet (e.g., via a lubricant pump of an internal combustion engine). To assist with flow of lubricant, the inlet 281 and the outlet 289 may be aligned with gravity.

As mentioned, during operation, thrust forces may be generated and transmitted along an axial direction, as represented by a z-axis. Such forces may be directed toward the compressor end or toward the turbine end. As described herein, a spring can apply preload to bearings and lubricant presence and pressure can damp axial vibration. To handle thrust forces in either direction, a spacer can include features that provide for pressure supported lubricant films on both ends. During operation, for compressor pulling conditions, a lubricant film between a spacer and a turbine side bearing can damp vibration; whereas, for turbine pulling conditions, a lubricant film between a spacer and a compressor side bearing can damp vibration. While a particular assembly may not include a spring, for example, where sufficient lubricant pressure provides for preloading, in general, inclusion of a spring (or springs) provides for more certain and defined preloading. For example, where pressure of a lubricant film on a compressor end of a spacer may not be high enough to provide a required preload (e.g., about 20 N), a spring can create a substantially constant force on a compressor side bearing to help stabilize a CHRA. As described herein, a spring is generally a biasing mechanism; accordingly, an assembly may include a spacer and a biasing mechanism.

Figure 3:
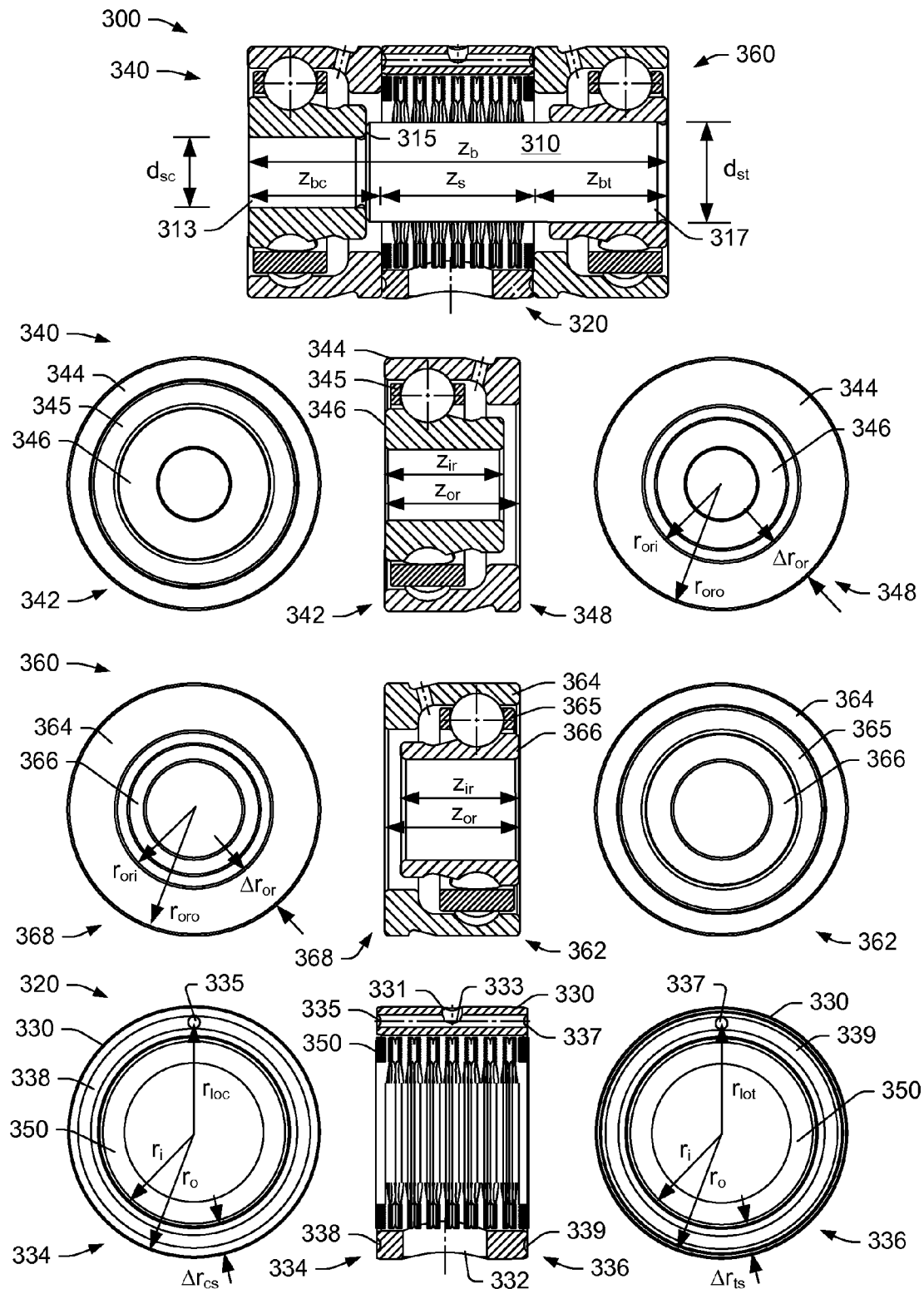
FIG. 3 is a series of views of an example of a bearing assembly and examples of components thereof.

FIG. 3 shows an example of a bearing assembly 300 that includes a spacer and spring subassembly 320, a compressor bearing 340 and a turbine bearing 360. As shown, the compressor bearing 340 includes opposing ends 342 and 348, an outer race 344, rolling elements 345 and an inner race 346. For the end 348, the outer race 344 has an inner radius $r_{ori}$ and an outer radius $r_{oro}$, which provide for an axial end face of annular dimension $\Delta r_{or}$ substantially therebetween. Further, the inner race 346 has an axial length $z_{ir}$ while the outer race 346 has a larger axial length $z_{or}$; thus, for the end 348, the inner race 346 is inset from the axial end face of the outer race 344. As shown, the turbine bearing 360 includes opposing ends 362 and 368, an outer race 364, rolling elements 365 and an inner race 366. For the end 368, the outer race 364 has an inner radius $r_{ori}$ and an outer radius $r_{oro}$, and an axial end face of annular dimension $\Delta r_{or}$ substantially therebetween. Further, the inner race 366 has an axial length $z_{ir}$ while the outer race 364 has a larger axial length $z_{or}$; thus, for the end 368, the inner race 366 is inset from the axial end face of the outer race 364. While the example of FIG. 3 shows balls as rolling elements, a bearing may include another type of rolling element (e.g., cylinders, etc.).

As described herein, the axial length of an outer race of a bearing may be of a length that acts to sufficiently reduce tilting of the outer race with respect to a central axis of a bore of a housing. For example, one or both bearings 340 and 360 may have an outer race with a respective axial length $z_{or}$ that is approximately equal to or greater than a respective outer race radius $r_{oro}$.

In the example of FIG. 3, the inner races 346 and 366 of the bearings 340 and 360 differ to accommodate a shaft 310 with a stepped diameter. Specifically, the shaft 310 includes a compressor side surface 313 disposed at a diameter $d_{sc}$, a turbine side surface 317 disposed at a diameter $d_{st}$ and an annular face 315 located at a step between the differing diameters where the annular face 315 is configured to abut the inner race 346 of the compressor bearing 340 (e.g., to locate the shaft 310 with respect to the spacer and spring subassembly 320).

In the example of FIG. 3, the spacer and spring subassembly 320 includes a spacer 330 and a spring 350. The spacer 330 is shaped as an annular body with opposing axial end faces 334 and 336 and various features to provide for lubricant film damping. For example, the spacer 330 includes a lubricant inlet 331 located on an outer surface (e.g., a cylindrical surface), a lubricant passage through bore 333 in fluid communication with the inlet 331, lubricant openings 335 and 337, and lubricant wells 338 and 339 where each well is in fluid communication with a respective one of the lubricant openings 335 and 337. Accordingly, lubricant provided to the inlet 331 can flow to the wells 338 and 339 and pressurize lubricant in these wells. Such features allow for lubricant film formation along the axial end faces 334 and 336 of the spacer 330. In the example of FIG. 3, a lubricant outlet 332 is also shown as being located on an outer surface of the spacer 330.

Various dimensions are also shown in the example of FIG. 3, including, at each end 334 and 336, a spacer inner radius $r_i$, a spacer outer radius $r_o$, and a lubricant opening radius $r_{loc}$ or $r_{lot}$. In FIG. 3, axial end faces are defined as existing substantially between the inner and outer radii, $\Delta r_{cs}$ and $\Delta r_{ts}$. As described herein, one or more dimensions may be the same or different for each end 334 and 336 of the spacer 330.

In the assembly 300, the axial end face 334 of the spacer 330 faces the axial end face 348 of the outer race 344 of the compressor bearing 340 and the axial end face 336 of the spacer 330 faces the axial end face 368 of the turbine bearing 360. As described herein, various features of a spacer allow for lubricant flow to an end face or end faces where lubricant can form a lubricant film or films that provide for damping. Further, as shown in the example of FIG. 3, the spring 350 can provide for application of a load. As described herein, for a spring disposed at least partially in a through bore of a spacer, an end of the spring may be configured to apply a load to a race of a bearing. While the example of FIG. 3 shows a single spring, as described herein, a subassembly may include more than one spring.

Figure 4:
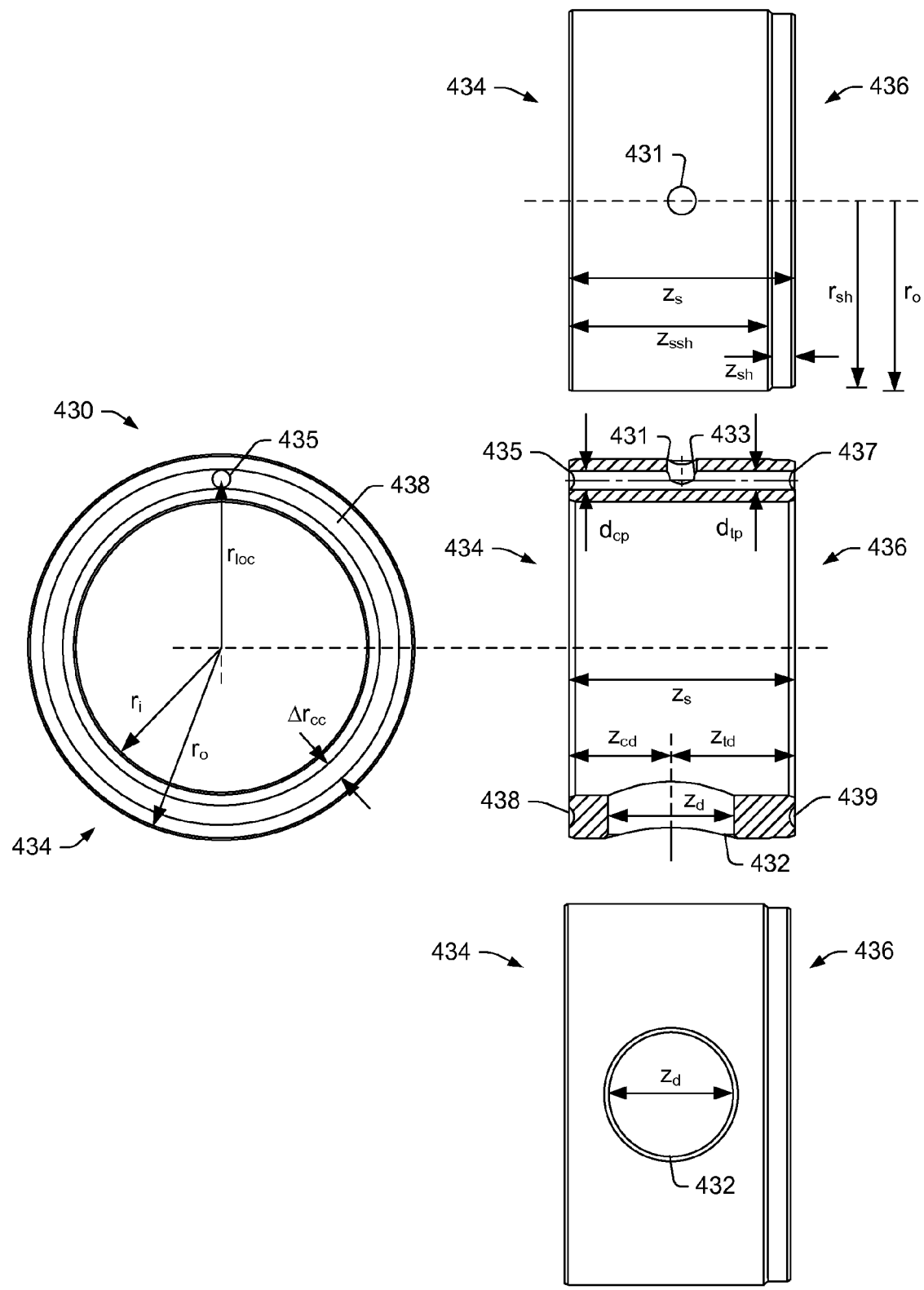
FIG. 4 is a series of views of an example of a spacer configured to space two bearings.

FIG. 4 shows an example of a spacer 430 along with various dimensions. The spacer 430 is shaped as an annular body with opposing axial end faces 434 and 436 and various features to provide for lubricant film damping. For example, the spacer 430 includes a lubricant inlet 431 located on an outer surface, a lubricant passage 433 in fluid communication with the inlet 431, lubricant openings 435 and 437, and lubricant wells 438 and 439 where each well is in fluid communication with a respective one of the lubricant openings 435 and 437. Accordingly, lubricant provided to the inlet 431 can flow to the wells 438 and 439 and pressurize lubricant in these wells. Such features allow for lubricant film formation along the axial end faces 434 and 436 of the spacer 430. In the example of FIG. 4, a lubricant outlet 432 is also shown as being located on an outer surface of the spacer 430.

As shown in FIG. 4, the lubricant passage 433 may be a through bore disposed in an annular wall of the spacer 430. Such a through bore may have an axis that is radially displaced and parallel to a central axis of the spacer 430. For example, the radius $r_{loc}$ may represent such a displacement. In the example of FIG. 4, the lubricant passage 433 may define two lubricant passages that are in fluid communication: a compressor side lubricant passage with a dimension $d_{cp}$ and a turbine side lubricant passage with a dimension $d_{tp}$. As described herein, the dimensions may differ for such passages to provide for different cross-sectional areas or flow dynamics (e.g., that differ between an inlet and the compressor and turbine ends). Where fluid communication exists between a compressor lubricant passage and a turbine lubricant passage, pressure applied to one axial end face of a spacer may be transferred to an opposing axial end face via lubricant (e.g., pressure acting on a lubricant film between the spacer and a turbine bearing may cause flow of lubricant toward the compressor bearing via a lubricant passage such as the passage 433).

In FIG. 4, while the spacer 430 includes the single inlet 431, a spacer may include more than one inlet. For example, a spacer may include a compressor lubricant passage inlet and a turbine lubricant passage inlet. Such inlets may be fed by a common housing passage or by separate housing passages. In general, features may be tailored to provide for compressor end and turbine end lubricant films with different dimensions, dynamics, etc. (e.g., to account for dynamics of compressor pulling and to account for dynamics of turbine pulling). As shown in FIG. 4, the compressor axial end face 434 of the spacer 430 includes an annular well or channel 438 with a width $\Delta r_{cc}$. As described herein, the shape, dimensions, etc., of the well 439 of the turbine axial end face 436 may be the same or differ from the well 438 of the compressor axial end face 434.

In the example of FIG. 4, the spacer 430 is asymmetric. For example, the opening 432, with a diameter $z_d$, is displaced toward the compressor end of the spacer 430 (e.g., $z_{td} > z_{cd}$) and the spacer 430 has a stepped outer surface that steps from an outer radius $r_o$ to a shoulder radius $r_{sh}$ at an axial dimension $z_{ssh}$. As described herein, a stepped outer surface may facilitate press-fitting a spacer into a bore of a housing (e.g., where spacer and bore dimensions are appropriately configured). Alternatively, or in addition to, a spacer may be located in a bore by use of one or more locating pins. Also, press-fitting may occur for a spacer with a uniform radius about an outer surface. In general, a spacer is oriented such that various features such as a lubricant inlet or outlet align with a corresponding feature of a housing. As described herein, the opening 432 or the opening 431 may be configured to receive a locating pin (e.g., a pin or an opening configured to allow for lubricant flow when the pin is positioned in the opening).

Figure 5:
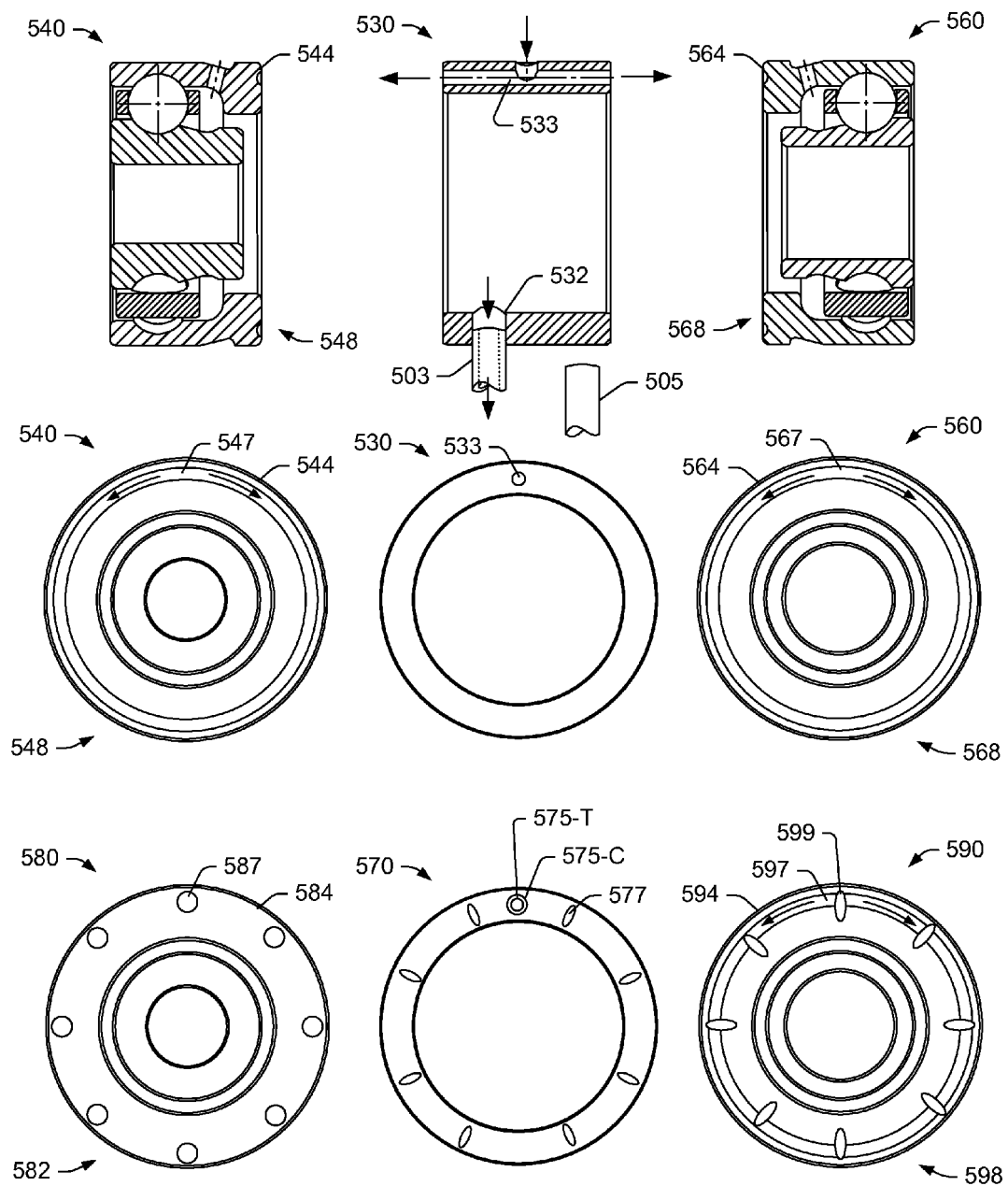
FIG. 5 is a series of views of examples of bearings and spacers.

FIG. 5 shows various examples of spacers and bearings, including arrows to indicate some directions of lubricant flow. As shown, a spacer 530 may be assembled with a compressor bearing 540 and turbine bearing 560 where an outer race 544 of the compressor bearing 540 includes a well 547 along an axial end face 548 and where an outer race 564 of the turbine bearing includes a well 567 along an axial end face 568. Accordingly, after assembly, a lubricant passage through bore 535 of the spacer 530 can provide lubricant to the wells 547 and 567 of the bearings 540 and 560, respectively, to allow for lubricant film formation.

Another example shown in FIG. 5 includes a bearing 580 with an outer race 584 that includes a plurality of isolated wells 587 along an axial end face 582. Such wells may provide for retention of lubricant in a manner supportive of a film. Yet another example includes a spacer 570 with isolated wells 577 and lubricant passages 575-C and 575-T, which have different cross-sectional lubricant flow areas. The opposing end of the spacer 570 may, for example, have similar wells, a single annular well, no wells, etc. In yet another example, a bearing 590 includes an axial end face 598 with an annular channel 597 and wells 599 in fluid communication with the annular channel 597. Such features may be tailored to provide for beneficial lubricant film formation, pressure characteristics, flow of lubricant in a film (e.g., for cooling), etc.

FIG. 5 also shows an example of a locating pin 503 configured for receipt by an opening 532. In this example, the locating pin 503 includes a passage for drainage of lubricant. In another example, a locating pin 505 is solid. Where the pin 505 is received tightly by the opening 532 (e.g., minimal clearance), lubricant may drain via ends of the spacer 530.

Figure 6:
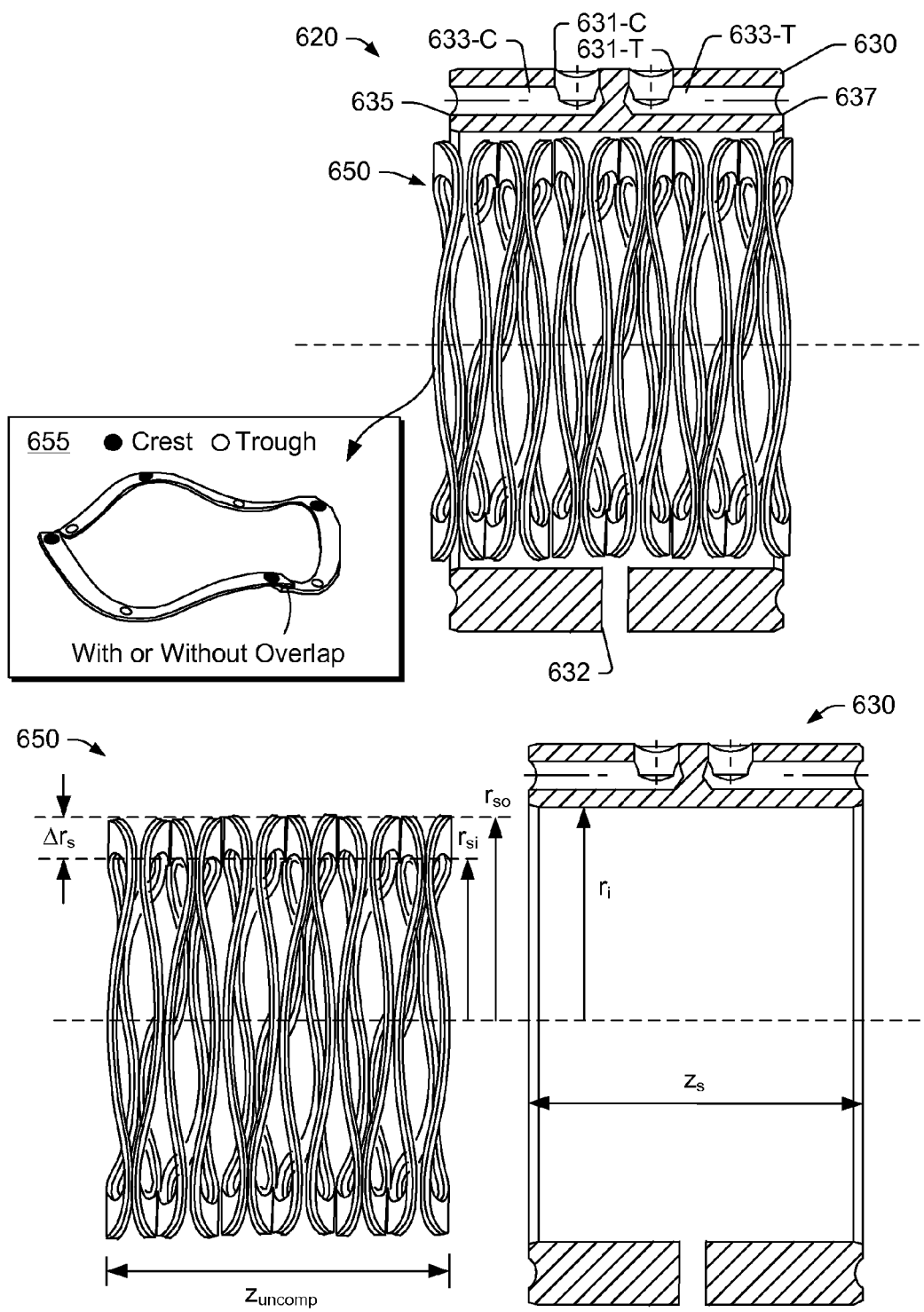
FIG. 6 is a series of views of an example of a spacer and spring subassembly.

FIG. 6 shows an example of an assembly 620 that includes a spacer 630 and a spring 650. As described herein, a spring may be a wave spring and made of a material such as a metal (e.g., steel or steel alloy). A wave spring may be configured such that it is not disturbed by its own natural frequency (e.g., "integrated damping"). A wave spring may be an interlaced or interwoven wave spring, a wave spring with or without overlap, a wave spring with or without a gap, etc. FIG. 6 shows an example of a single wave spring element 655 where crests and troughs are labeled. Such elements may be stacked, rotated and stacked, etc., to provide a spring such as the spring 650. The spring 650 may have an appropriate outer radial dimension $r_{so}$ to fit inside a central through bore of the spacer 630 (e.g., having radius $r_i$). The spring 650 may have a contact area defined by a difference $\Delta r_s$ between an inner radius $r_s$ and outer radius $r_{so}$ and optionally crests (e.g., consider flat crest regions for contacting and biasing an outer race of a bearing). In the example of FIG. 6, the spring 650 is shown as having an uncompressed axial length $z_{uncomp}$ that exceeds an axial length $z_s$ of the spacer 630. As described herein, some clearance may exist between an inner radius of a spacer (e.g., $r_i$) and an outer radius of a spring (e.g., $r_{so}$), with some assurance that contact will not occur between the spring and a shaft. Clearance may be appropriate to handle a spring or biasing mechanism that changes in radial dimension (or dimensions) depending on length (e.g., compression/decompression). A wave spring may be configured to maintain a relatively constant outer radius over a normal operational amount of axis displacement.

As shown in the example of FIG. 6, the spacer 630 includes a lubricant inlet 631-C in fluid communication with a lubricant passage 633-C and a lubricant inlet 631-T in fluid communication with a lubricant passage 633-T (e.g., an isolated or dedicated compressor side passage and an isolated or dedicated turbine side passage). Where the spacer 630 is symmetric, it may be installed in a bore of a housing in either one of two orientations; whereas, for an asymmetric spacer, it may be oriented with the passage 633-T toward a turbine and the passage 633-C toward a compressor. The spacer 630 is also shown as including an opening 632, which may be configured for receipt of a locating pin and optionally located at a midpoint along the axial length of the spacer 630 to provide for symmetry.

Figure 7:
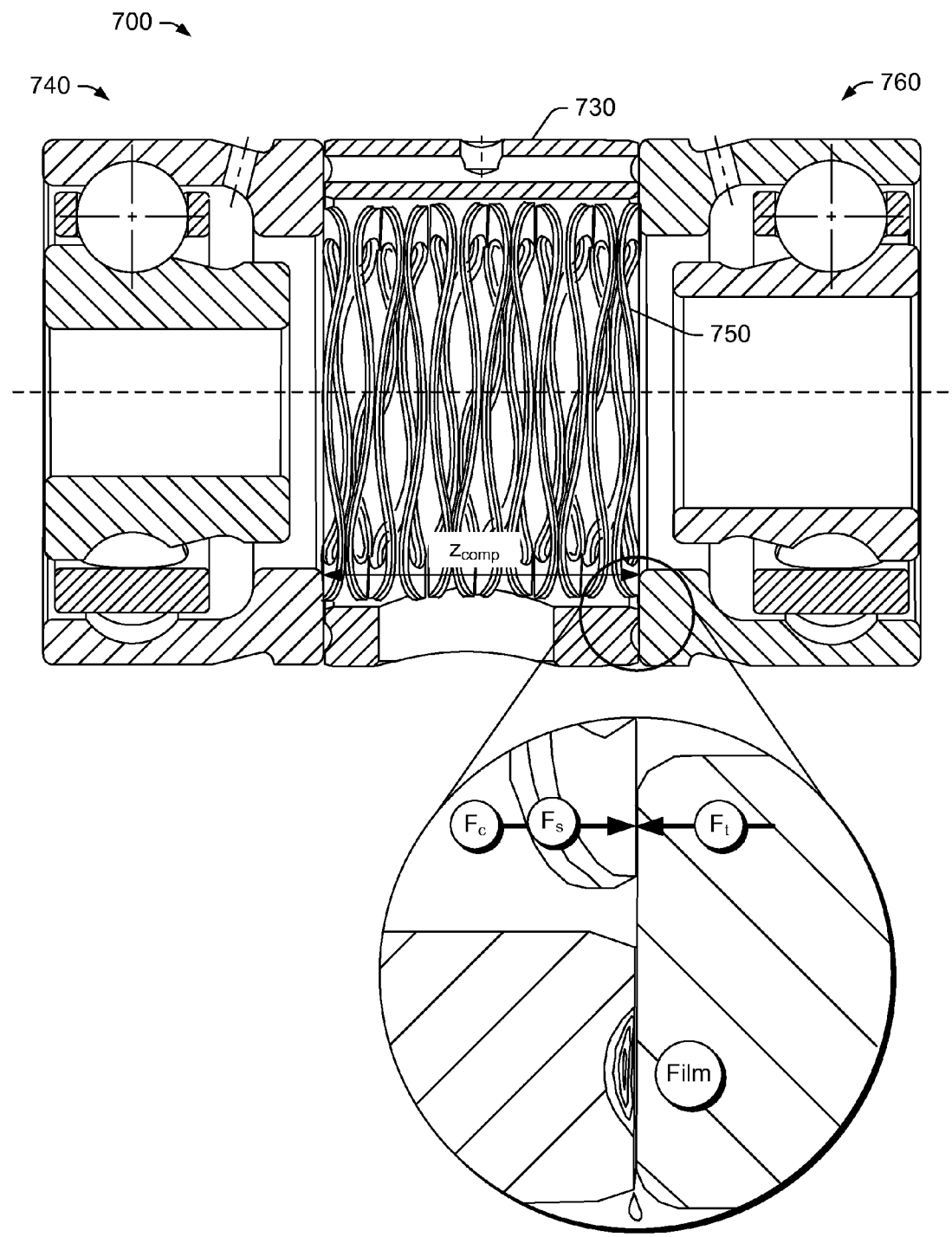
FIG. 7 is a cross-sectional view of a bearing assembly that illustrates two damping mechanisms.

FIG. 7 shows a bearing assembly 700 that includes a spacer 730, a spring 750 and a pair of bearings 740 and 760. In the example of FIG. 7, the spring 750 is shown in a compressed state where one end of the spring 750 (e.g., crests, etc.) contacts the bearing 740 and another end of the spring 750 (e.g., crests, etc.) contacts the bearing 760. An approximate force diagram is also shown where axial compressor and spring forces are opposed to axial turbine force. Such a force diagram may also apply for a spacer/compressor bearing interface where axial turbine and spring forces are opposed to axial compressor force. Additionally, a film is shown as existing between an axial end face of the spacer 730 and an axial end face of the bearing 760. Such a film is supported by lubricant flow in a well (e.g., an annular channel). Accordingly, the assembly 700 includes two mechanisms to damp axial forces: a spring mechanism and a lubricant film mechanism. These mechanisms can act to reduce at least vibration in a CHRA, which, in turn, can provide, for example, decreased noise, reduced wear, increased longevity, increased efficiency, improved environment, etc. While a spring mechanism is mentioned, more generally, a mechanical biasing mechanism may be used in conjunction with a lubricant film mechanism (e.g., a combination of mechanical and lubricant or "hydraulic" mechanisms).

Figure 8:
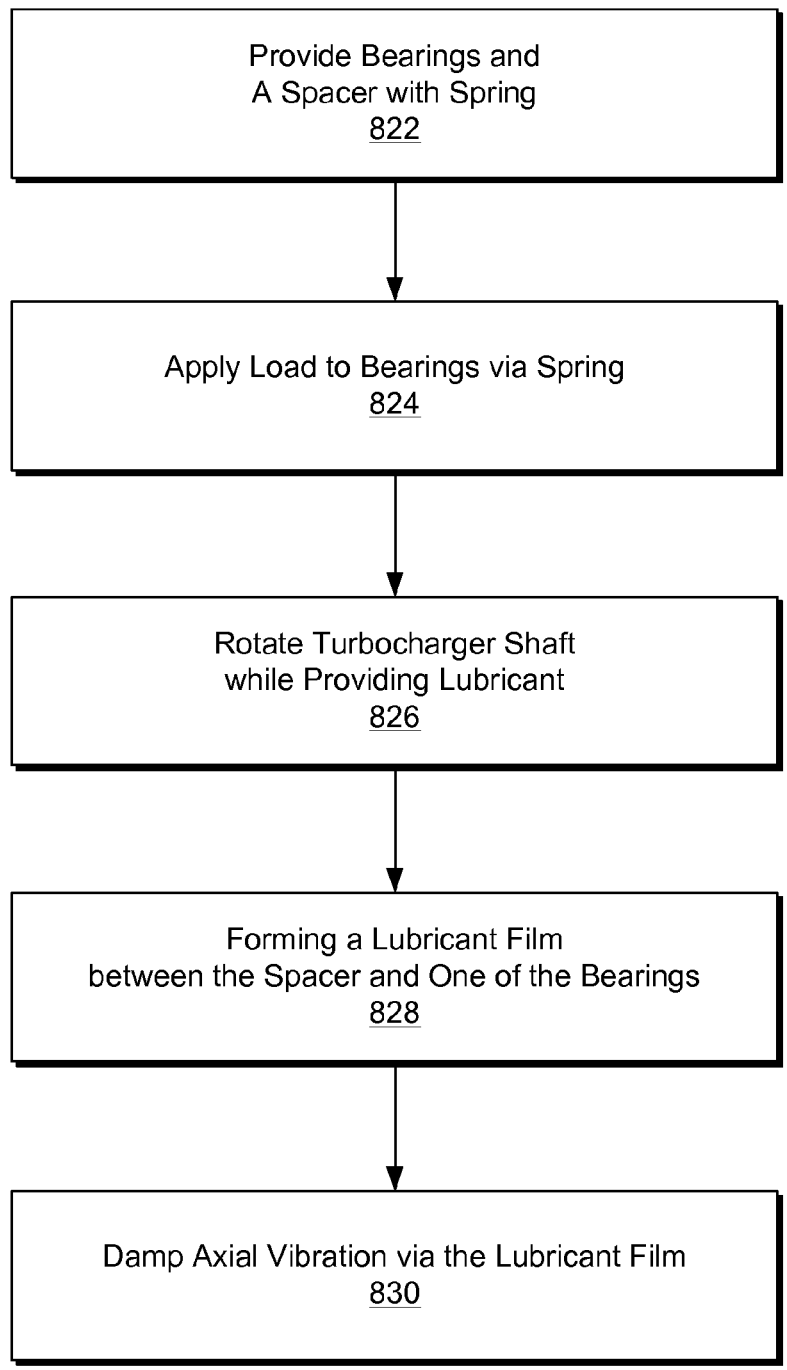
FIG. 8 is a block diagram of a method that includes damping vibration using a lubricant film.

FIG. 8 shows an example of a method 800 that includes damping axial vibration. The method 800 includes a provision block 822 for providing bearings and a spacer with a spring (e.g., mechanical biasing mechanism), an application block 824 for applying load to the bearings via the spring (e.g., preload), a rotation block 826 for rotating a turbocharger shaft supported by the bearings while providing lubricant, a formation block 828 for forming a lubricant film between the spacer and one of the bearings, and a damping block 830 for damping axial vibration via the lubricant film.

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit. Such a controller may optionally be programmed to control lubricant flow to a turbocharger, lubricant temperature, lubricant pressure, lubricant filtering, etc.

As described herein, a spacer can be configured to space two turbocharger bearings where the spacer is shaped as an annular body that defines a central through bore and that includes an axial end face, an opposing axial end face, a lubricant passage configured to direct lubricant to the axial end face, and a lubricant passage configured to direct lubricant to the opposing axial end face. Such an annular body can include at least one lubricant inlet located on an outer surface and disposed between the axial end faces (e.g., between the axial positions of the axial end faces).

As described herein, a lubricant passage of a spacer can be a portion of a radially displaced through bore (e.g., radially displaced from a central axis of the spacer). As shown in various examples, a radially displaced through bore of a spacer can have an axis disposed substantially parallel to an axis of the central through bore of the spacer and where a lubricant inlet of the spacer is in fluid communication with the radially displaced through bore.

As described herein, a spacer may have axial end faces with no lubricant wells, an axial end face with one or more lubricant wells or two axial end faces, each with one or more lubricant wells. As described herein, a lubricant well may be an isolated well or a well configured to receive lubricant from a lubricant passage (e.g., an annular channel). A spacer may optionally include an opening located on an outer surface where the opening is configured to drain lubricant, to receive a locating pin, to drain lubricant and receive a locating pin, etc.

As described herein, a spacer can include a spring (e.g., as a spacer and spring assembly). As shown in various examples, a spring can have an uncompressed axial length that exceeds an axial length of a spacer. As described herein, a spring may be a wave spring. In general, a spring may be considered a mechanical biasing mechanism.

As described herein, a turbocharger bearing assembly can include a compressor side bearing; a turbine side bearing; and a spacer configured to axially space the compressor side bearing and the turbine side bearing where the spacer includes a spring disposed in a central through bore and lubricant passages to direct lubricant to spacer-bearing interfaces. In such an example, the spring may be optional and generally include an uncompressed axial length that exceeds an axial length of the spacer (e.g., to provide for loading of the bearings). As described herein, a spacer-bearing interface can include one or more lubricant wells (e.g., to support formation of a film across the interface). A spacer can include lubricant passages configured to direct lubricant to one or more lubricant wells.

As described herein, a method can include providing turbocharger bearings and a spacer with a spring; applying a load to the bearings via the spring; rotating a turbocharger shaft supported by the bearings while providing lubricant; forming a lubricant film between the spacer and one of the bearings; and damping axial vibration via the lubricant film. In such a method, the lubricant film may be a film disposed between a compressor side bearing and the spacer or a film disposed between a turbine side bearing and the spacer. Such a method may further include forming an additional lubricant film between the spacer and another one of the bearings.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A spacer configured to space two turbocharger bearings, the spacer comprising:
an annular body that defines a central through bore and that comprises an axial end face, an opposing axial end face, a lubricant passage configured to direct lubricant to the axial end face, and a lubricant passage configured to direct lubricant to the opposing axial end face wherein at least one of the axial end faces comprises a lubricant well.

2. The spacer of claim 1 wherein the annular body comprises at least one lubricant inlet located on an outer surface and disposed between the axial end faces.

3. The spacer of claim 1 wherein each of the lubricant passages comprises a portion of a radially displaced through bore.

4. The spacer of claim 3 wherein the radially displaced through bore comprises an axis disposed substantially parallel to an axis of the central through bore.

5. The spacer of claim 3 wherein the annular body comprises a lubricant inlet in fluid communication with the radially displaced through bore.

6. The spacer of claim 1 wherein the lubricant well comprises an annular channel configured to receive lubricant from a respective one of the lubricant passages.

7. The spacer of claim 1 wherein the lubricant well comprises an isolated well.

8. The spacer of claim 1 wherein the annular body comprises an opening located on an outer surface, the opening configured to drain lubricant.

9. The spacer of claim 1 further comprising a spring.

10. The spacer of claim 9 wherein the spring comprises an uncompressed axial length that exceeds an axial length of the spacer.

11. The spacer of claim 9 wherein the spring comprises a wave spring.

12. A turbocharger bearing assembly comprising:
a compressor side bearing;
a turbine side bearing; and
a spacer configured to axially space the compressor side bearing and the turbine side bearing wherein the spacer comprises a spring disposed in a central through bore and lubricant passages to direct lubricant to spacer-bearing interfaces wherein each of the spacer-bearing interfaces comprises a respective lubricant well.

13. The turbocharger bearing assembly of claim 12 wherein the spring comprises an uncompressed axial length that exceeds an axial length of the spacer.

14. The turbocharger bearing assembly of claim 12 wherein the lubricant passages direct lubricant to the lubricant wells.

15. A method comprising:
providing turbocharger bearings and a spacer with a spring;
applying a load to the bearings via the spring;
rotating a turbocharger shaft supported by the bearings while providing lubricant;
forming a lubricant film between the spacer and one of the bearings; and
damping axial vibration via the lubricant film.

16. The method of claim 15 wherein the lubricant film comprises a film disposed between a compressor side bearing and the spacer.

17. The method of claim 15 wherein the lubricant film comprises a film disposed between a turbine side bearing and the spacer.

18. The method of claim 15 further comprising forming an additional lubricant film between the spacer and another one of the bearings.

19. A spacer configured to space two turbocharger bearings, the spacer comprising:
an annular body that defines a central through bore and that comprises an axial end face, an opposing axial end face, a lubricant passage configured to direct lubricant to the axial end face, and a lubricant passage configured to direct lubricant to the opposing axial end face wherein each of the lubricant passages comprises a portion of a radially displaced through bore and wherein the radially displaced through bore comprises an axis disposed substantially parallel to an axis of the central through bore.

* * * * *